J. C. RAMSEY.
GAME TRAP.
APPLICATION FILED JUNE 26, 1918.

1,279,436.

Patented Sept. 17, 1918.

Witnesses.
J H Crawford
J. B. Middleton

Inventor
J. C. Ramsey,
By Victor J. Evans
Attorney

UNITED STATES PATENT OFFICE.

JAMES C. RAMSEY, OF ROSWELL, NEW MEXICO.

GAME-TRAP.

1,279,436.     Specification of Letters Patent.     Patented Sept. 17, 1918.

Application filed June 26, 1918. Serial No. 242,038.

*To all whom it may concern:*

Be it known that I, JAMES C. RAMSEY, a citizen of the United States, residing at Roswell, in the county of Chaves and State of New Mexico, have invented new and useful Improvements in Game-Traps, of which the following is a specification.

This invention relates to an improved attachment for game traps and the principal object of the invention is to provide means for preventing the trap being sprung by small animals.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
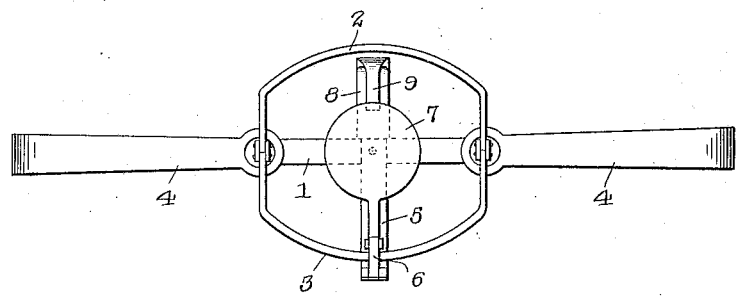
Figure 1 is a view of a trap supplied with my invention.
Figure 2:
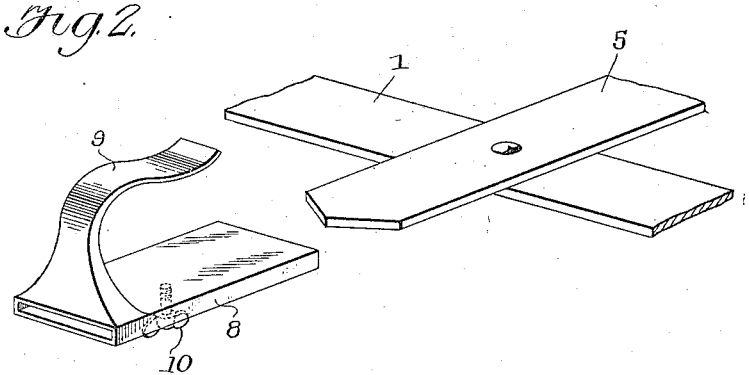
Fig. 2 is a plan view showing the cross piece of the trap with the attachment about to be placed thereon.

The drawing shows the invention applied to an ordinary game trap which comprises a base plate 1 having the jaws 2 and 3 pivoted thereto, said jaws being normally held in closed position by the springs 4. 5 indicates the cross piece carrying the locking pawl 6. 7 represents the pan. This pan engages the pawl to hold the jaws in open position, as is well known.

When an animal steps on the pan the pawl will release the jaws so that the springs will force said jaws to close and thus grip the foot of the animal.

When the trap is set for large animals, small animals often spring the trap by stepping on the pan and it is the object of my invention to prevent the trap being sprung by such small animals.

In carrying out my invention I provide a tubular base 8 of such dimensions as to fit over the projecting end of the cross piece 5 and to frictionally engage the same so that said base is held to said cross piece. The base has secured thereto, or formed therewith a spring arm 9 of curved formation, which extends upwardly from one end of the base. This arm also extends forwardly toward the other end of the base and is so spaced from said base that it will form a rest for the pan when the parts are in operative position. I provide a set screw 10 engaging a screw threaded hole in the bottom of the base 8 for clamping the attachment to the trap.

The spring is made of sufficient strength as to prevent the pan being lowered when stepped upon by a small animal. A large animal, however, will lower the pan against the action of the pan and thus spring the trap.

It will be seen that the attachment may be easily and quickly removed or placed on the trap and by providing attachments with springs of different tensions the trap may be set to catch animals of different sizes.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An attachment for traps comprising a tubular base adapted to fit over the projecting end of the cross piece of the trap and a spring arm connected with one end of the base and extending upwardly and forwardly above the same to engage the pan.

2. An attachment for traps comprising a tubular base of rectangular form in cross section and adapted to fit over the projecting end of the cross piece of the trap, a set screw carried by the base for clamping the same to the set screw piece and a spring arm connected with said base for engaging the pan of the trap.

In testimony whereof I affix my signature.

JAMES C. RAMSEY.

Copies of this patent may be obtained for five cents each, by addressing the "Commissioner of Patents, Washington, D. C."